(12) United States Patent
Borowiec et al.

(10) Patent No.: US 9,444,822 B1
(45) Date of Patent: Sep. 13, 2016

(54) STORAGE ARRAY ACCESS CONTROL FROM CLOUD-BASED USER AUTHORIZATION AND AUTHENTICATION

(71) Applicant: Pure Storage, Inc., Mountain View, CA (US)

(72) Inventors: Benjamin P. Borowiec, Santa Clara, CA (US); Jimmy T. Hu, Foster City, CA (US); Ethan L. Miller, Santa Cruz, CA (US); Terence W. Noonan, Vadnais Heights, MN (US); Constantine P. Sapuntzakis, Mountain View, CA (US); Neil A. Vachharajani, San Francisco, CA (US); Daquan Zuo, Sunnyvale, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 14/726,449

(22) Filed: May 29, 2015

(51) Int. Cl.
| G06F 7/04 | (2006.01) |
| H04L 29/06 | (2006.01) |
| H04L 9/32 | (2006.01) |

(52) U.S. Cl.
CPC ........... *H04L 63/101* (2013.01); *H04L 9/3242* (2013.01); *H04L 9/3247* (2013.01); *H04L 2209/24* (2013.01); *H04L 2209/72* (2013.01)

(58) Field of Classification Search
CPC ........ G06F 21/30; H04L 9/32; H04L 63/105
USPC ................ 726/4, 8, 9, 11, 15; 713/150, 193; 707/705
See application file for complete search history.

(56) References Cited

U.S. PATENT DOCUMENTS

| 7,334,124 | B2 * | 2/2008 | Pham et al. | 713/162 |
| 8,042,163 | B1 * | 10/2011 | Karr et al. | 726/9 |
| 8,086,585 | B1 * | 12/2011 | Brashers et al. | 707/705 |
| 8,387,136 | B2 * | 2/2013 | Lee et al. | 726/20 |
| 8,465,332 | B2 * | 6/2013 | Hogan | H01R 13/187 439/733.1 |

(Continued)

FOREIGN PATENT DOCUMENTS

WO  WO -2013/071087 A1  5/2013

OTHER PUBLICATIONS

C Hota, Capability-based cryptographic data access control in cloud computing, Advanced Networking and Applicaitons, Aug. 2011, vol. 1 pp. 1-8.*

(Continued)

*Primary Examiner* — Dede Zecher
*Assistant Examiner* — Viral Lakhia
(74) *Attorney, Agent, or Firm* — Edward J. Lenart; Kennedy Lenart Spraggins LLP

(57) ABSTRACT

Providing authorization and authentication in a cloud for a user of a storage array includes: receiving, by a storage array access module from a client-side array services module, a token representing authentication of user credentials and authorized access privileges defining one or more storage array services accessible by the user, where the token is generated by a cloud-based security module upon authentication of the user credentials and identification of authorized access privileges for the user; receiving, by the storage array access module from the user, a user access request to one or more storage array services; and determining, by the storage array access module, whether to grant the user access request in dependence upon the authorized access privileges represented by the token.

16 Claims, 6 Drawing Sheets

(56) References Cited

U.S. PATENT DOCUMENTS

| | | | |
|---|---|---|---|
| 8,578,442 B1 | 11/2013 | Banerjee | |
| 8,613,066 B1* | 12/2013 | Brezinski et al. | 726/7 |
| 8,762,642 B2* | 6/2014 | Bates | G06F 11/2064 |
| | | | 711/117 |
| 8,769,622 B2* | 7/2014 | Chang | G06F 21/62 |
| | | | 713/168 |
| 8,800,009 B1* | 8/2014 | Beda et al. | 726/6 |
| 8,850,546 B1* | 9/2014 | Field et al. | 726/8 |
| 8,931,041 B1* | 1/2015 | Banerjee | 726/1 |
| 8,990,905 B1* | 3/2015 | Bailey et al. | 726/5 |
| 9,124,569 B2* | 9/2015 | Hussain | H04L 63/08 |
| 9,209,973 B2* | 12/2015 | Aikas | H04L 67/1097 |
| 9,300,660 B1* | 3/2016 | Borowiec | H04L 67/10 |
| 2006/0129817 A1 | 6/2006 | Borneman et al. | |
| 2013/0007845 A1* | 1/2013 | Chang et al. | 726/4 |
| 2013/0036272 A1* | 2/2013 | Nelson | H04L 67/1097 |
| | | | 711/147 |
| 2013/0071087 A1* | 3/2013 | Motiwala | H04N 21/8455 |
| | | | 386/241 |
| 2013/0219164 A1* | 8/2013 | Hamid | 713/150 |
| 2013/0332614 A1* | 12/2013 | Brunk | H04L 67/1097 |
| | | | 709/226 |
| 2014/0020083 A1* | 1/2014 | Fetik | 726/11 |
| 2014/0082715 A1 | 3/2014 | Grajek et al. | |
| 2014/0090009 A1* | 3/2014 | Li et al. | 726/1 |
| 2014/0096220 A1* | 4/2014 | Da Cruz Pinto et al. | 726/9 |
| 2014/0101434 A1* | 4/2014 | Senthurpandi et al. | 713/150 |
| 2014/0201541 A1* | 7/2014 | Paul et al. | 713/193 |
| 2014/0215590 A1* | 7/2014 | Brand | H04L 67/1097 |
| | | | 726/6 |
| 2014/0230017 A1* | 8/2014 | Saib | 726/4 |
| 2014/0282983 A1 | 9/2014 | Ju et al. | |
| 2014/0373104 A1* | 12/2014 | Gaddam et al. | 726/4 |
| 2014/0373126 A1* | 12/2014 | Hussain et al. | 726/9 |
| 2015/0089569 A1* | 3/2015 | Sondhi | H04L 63/08 |
| | | | 726/1 |

OTHER PUBLICATIONS

Li et al., "Access Control for the Services Oriented Architecture", Proceedings of the 2007 ACM Workshop on Secure Web Services (SWS'07), Nov. 2007, pp. 9-17, ACM New York, NY.

PCT Search Report and Written Opinion, Apr. 26, 2016; PCT Application No. PCT/US2016/015006, 12 pages.

The International Search Report and the Written Opinion received from the International Searching Authority (ISA) for International Application No. PCT/US2016/015008, dated May 4, 2016, 12 pages.

* cited by examiner

STORAGE ARRAY ACCESS CONTROL FROM CLOUD-BASED USER AUTHORIZATION AND AUTHENTICATION

BACKGROUND

1. Field of Technology

The field of technology is data processing, or, more specifically, methods, apparatus, and products for providing authorization and authentication in a cloud for a user of a storage array.

2. Description of Related Art

Data centers may include many computing components including servers, network devices, and storage arrays. As the need for storage of large amounts of data and efficient access to that data increases, storage array technology is advancing. Such storage arrays may provide persistent storage for any number of computing devices in a data center. Given that many data centers provide services to many different users, various considerations must be taken into account to provide efficient, useful, and secure access to and administration of storage arrays. Security of storage array administration and access to storage array services may be highly complex.

SUMMARY

Methods, apparatus, and products for providing authorization and authentication in a cloud for a user of a storage array are disclosed. In some embodiments, providing such authorization and authentication includes: receiving, by a cloud-based security module from a client-side array services module, user credentials; authenticating, by the cloud-based security module, the user credentials; identifying, by the cloud-based security module, authorized access privileges defining one or more storage array services accessible by the user; generating, by the cloud-based security module, a token representing the authentication of the user credentials and the authorized access privileges; and providing, by the cloud-based security module to the client-side array services module, the token.

In some embodiments, providing authorization and authentication in a cloud for a user of a storage array includes receiving, by a storage array access module from a client-side array services module, a token representing authentication of user credentials and authorized access privileges defining one or more storage array services accessible by the user, where the token is generated by a cloud-based security module upon authentication of the user credentials and identification of authorized access privileges for the user; receiving, by the storage array access module from the user, a user access request to one or more storage array services; and determining, by the storage array access module, whether to grant the user access request in dependence upon the authorized access privileges represented by the token.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, apparatus, and products for providing authorization and authentication in a cloud for a user of a storage array in accordance with the present invention are described with reference to the accompanying drawings, beginning with FIG. 1. The term 'cloud' as used in this specification refers to systems and computing environments that provide services to user devices through the sharing of computing resources through a network. Generally, the user device is unaware of the exact computing resources utilized by the cloud system to provide the services. Although in many cases such 'cloud' environments or systems are accessible via the Internet, readers of skill in the art will recognize that any system that abstracts the use of shared resources to provide services to a user through any network may be considered a cloud-based system.

Figure 1:
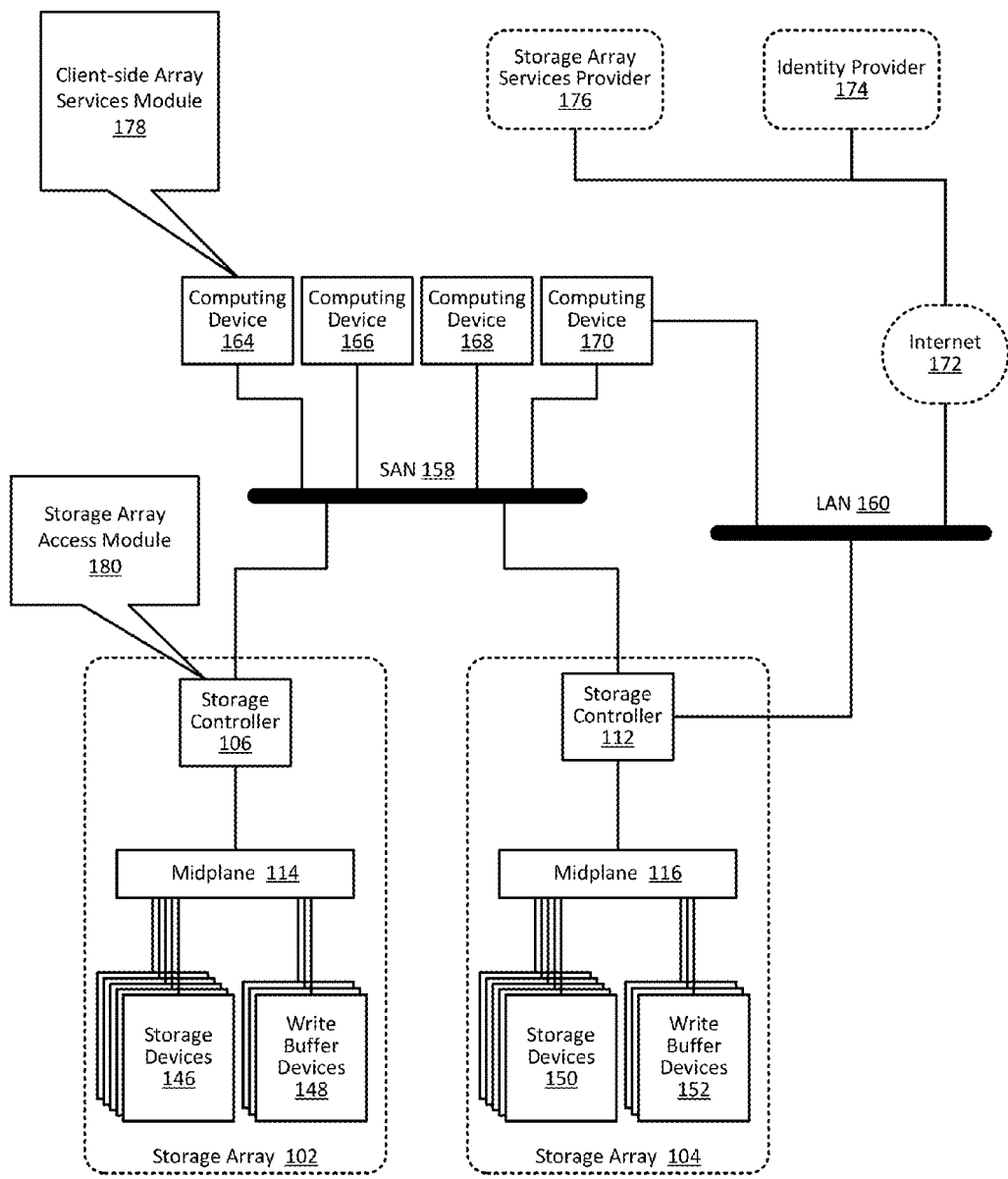
FIG. 1 sets forth a block diagram of a system configured for providing authorization and authentication in a cloud for a user of a storage array according to embodiments of the present invention.

FIG. 1 sets forth a block diagram of a system configured for providing authorization and authentication in a cloud for a user of a storage array according to embodiments of the present invention. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164-170) in the example of FIG. 1 are coupled for data communications to a number of storage arrays (102, 104) through a storage area network (SAN) (158) as well as a local area network (160) (LAN). The SAN (158) may be implemented with a variety of data communications fabrics, devices, and protocols. Example fabrics for such a SAN may include Fibre Channel, Ethernet, Infiniband, SAS (Serial Attached Small Computer System Interface), and the like. Example data communications protocols for use in such a SAN (158) may include ATA (Advanced Technology Attachment), Fibre Channel Protocol, SCSI, iSCSI, HyperSCSI, and others. Readers of skill in the art will recognize that a SAN is just one among many possible data communications couplings which may be implemented between a computing device and a storage array. Any other such data communications coupling is well within the scope of embodiments of the present invention.

The local area network (160) of FIG. 1 may also be implemented with a variety of fabrics and protocols. Examples of such fabrics include Ethernet (802.3), wireless (802.11), and the like. Examples of such data communications protocols include TCP (Transmission Control Protocol), UDP (User Datagram Protocol), IP (Internet Protocol), HTTP (HyperText Transfer Protocol), WAP (Wireless Access Protocol), HDTP (Handheld Device Transport Protocol), SIP (Session Initiation Protocol), RTP (Real Time Protocol) and others as will occur to those of skill in the art.

The example storage arrays (102, 104) of FIG. 1 provide persistent data storage for the computing devices. Each storage array (102, 104) includes a storage controller (106, 112). The storage controller is a module of automated computing machinery comprising computer hardware, computer software, or a combination of computer hardware and software. The storage controller may be configured to carry out various storage-related tasks. Such tasks may include writing data received from a computing device to storage, erasing data from storage, retrieving data from storage to provide to a computing device, monitoring and reporting of disk utilization and performance, performing RAID (Redundant Array of Independent Drives) or RAID-like data redundancy operations, compressing data, encrypting data, and so on.

Each storage controller (106, 112) may be implemented in a variety of ways, including as an FPGA (Field Programmable Gate Array), a PLC (Programmable Logic Chip), an ASIC (Application Specific Integrated Circuit), or computing device that includes discrete components such as a central processing unit, computer memory, and various adapters. Each storage controller (106, 112) may, for example, include a data communications adapter configured to support communications via the SAN (158) and the LAN (160). Only one of the storage controllers (112) in the example of FIG. 1 is depicted as coupled to the LAN (160) for data communications for clarity. Readers should understand that both storage controllers (106, 112) are independently coupled to the LAN (160). Each storage controller (106, 112) may also, for example, include an I/O controller or the like that couples the storage controller (106, 112) for data communications, through a midplane (114), to a number of storage devices (146, 150), and a number of write buffer devices (148, 152) devices.

Each write buffer device (148, 152) may be configured to receive, from the storage controller (106, 112), data to be stored in the storage devices (146). Such data may originate from any one of the computing devices (164-170). In the example of FIG. 1, writing data to the write buffer device may be carried out more quickly than writing data to the storage device. The storage controller (106, 112) may be configured to effectively utilize the write buffer devices (148, 152) as a quickly accessible redundant buffer for data destined to be written to storage. In this way, if the storage device to which the data is to be written fails or if the write does not complete, the write buffer device may maintain the data to be written during a retry of the write or during failover of the storage device to another location. That is, the write buffer device may provide redundancy for the storage devices.

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives ("Flash drives"), and the like.

In addition to being coupled to the computing devices through the SAN (158), the storage arrays may also be coupled to the computing devices through the LAN (160) and to one or more cloud service providers through the Internet (172). One example cloud service in FIG. 1 is a storage array services provider (176). The storage array service provider (176) may be configured to provide various storage array services such as reporting of storage array performance characteristics, configuration control of the storage arrays, and the like. The storage array services provider may rely on modules executing on the storage array itself to gather or process such data.

Another example cloud service in FIG. 1 is an identity provider (174). An identity provider (IDP) is a cloud service that may be configured to provide identifiers for users looking to interact with a system and assert to such a system that an identifier presented by a user is known to the IDP. In the example of FIG. 1, the IDP (174) may authenticate user credentials of the computing devices (164-170) for access to the storage arrays (102, 104).

The system of FIG. 1 may be configured, according to embodiments of the present invention, to provide authorization as well as authentication for a user of a storage array. To that end, either of the IDP (174) or cloud-based storage array services provider (176) may be configured to include or operate as a cloud-based security module. Such a cloud-based security module as the term is used in this specification refers to a module of automated computing machinery that includes computer hardware, computer software, or an aggregation of hardware and software that is configured for providing authorization and authentication in a cloud for a user of a storage array according to embodiments of the present invention.

The cloud-based security module may receive, from a client-side array services module, user credentials. Such user credentials may take various forms including, for example, a user identifier and password.

A client-side array services module is a module of automated computing machinery that includes computer hardware, computer software, or an aggregation of hardware and software that is configured to present, locally, a user interface for accessing cloud-based storage array services. A client-side array services module be implemented in a variety of ways, as a command-line interface, a graphical user interface ('GUI'), as a web service, as a web browser or component of a web browser, or the like. The client-side array services module may access services provided by the storage array services provider (176) through an application program interface (API) presented by the storage array services provider.

In some embodiments, the client-side array services module may be a web browser configured for cross-domain resource sharing. Web browsers configured according to the HTML 5 standard, for example, may implement CORS (Cross-Origin Resource Sharing). CORS enables one web page in a first domain to request resources provided by a second web page in a second domain. To that end, the client-side array services module (178) in the example of FIG. 1, may present a user interface that appears to be a portal to access storage array services, while relying entirely on a third party (such as the IDP) to perform authentication of the user's identity.

The client-side array services module (178) may be provide one or more service options to a user of a storage array. Such service options may be services supported by the cloud-based storage array services provider (176). Upon selection of one of those service options, the client-side array services module (178) may prompt a user for user credentials and receive those user credentials through one or more user input devices. The client-array services module (178) may then provide those user credentials to the identity provider through the LAN (160) and Internet (172).

Upon receipt, the IDP may authenticate the user credentials, identify authorized access privileges defining one or more storage array services accessible by the user, generate a token representing the authentication of the user credentials and the authorized access privileges; and provide the token to the client-side array services module (178). The access privileges for a user define the user's accessibility to storage array services. Different users may be provided access to different services for security purposes. Users may granted be access to services for all storage arrays or only subset of all of the storage arrays. Further, a 'user' may be a user of the storage array (one who stores and retrieves data in the storage array) or a system administrator that manages the storage array.

The access privileges may be defined in the cloud-based security module (the IDP in the example of FIG. 1) for users with an association of each user with one of a plurality of profiles, and each profile may specify access privileges for users associated with the profile. Each user may be associated with one or more profiles. Examples of such profiles may include: a read-only profile specifying, for users associated with the read only profile, read-only access privileges; a modify profile specifying, for users associated with the modify profile, read and modify access privileges; and an administrator profile specifying, for users associated with the administrator profile, all available access privileges. Readers will understand that these are but a few of many possible profiles that may be implemented. For example, a profile may be implemented that is storage-array specific profile. Such a profile may specify, for users associated with that profile, access privileges for a single storage array. In other embodiments, a multi-array profiles may be implemented that specifies, for user associated with that profile, access privileges for multiple storage arrays.

The client-side array services module may then provide the token to a storage array access module (180). The storage array access module (180) is a module of automated computing machinery that includes computer hardware, computer software, or an aggregation of hardware and software that is configured to perform various tasks for the storage array and provide results of services to a user. The storage array access module (180) may receive software to execute that performs the services provided by the storage array services provider (176). The storage array access module (180) may also receive configuration information from the storage array services provider (176) where such information is utilized by the storage array access module (180) to configure the storage array. The storage array access module (180) may operate in such a way that the module does not appear directly to a user through the client-side array services module. That is, a user, if authorized, my access various services provided by the storage array services provider (176) through utilization of the storage array access module (180), even without knowledge of the storage array access module's (180) operation.

The storage array access module (180) in the example of FIG. 1 may be configured for providing authorization and authentication in a cloud for a user of a storage array in accordance with embodiments of the present invention. The storage array access module (180) may receive, from the client-side array services module (178), the token generated by the IDP. Upon receiving a request for access to one or more storage array services from the user (possibly through the storage array services provider (176), the storage array access module (180) may determine whether to grant the user access request in dependence upon the authorized access privileges represented by the token. Upon granting the request the storage array access module (180) may provide the results of such service either directly to the client-side array services module (178) or through the storage array services provider (176) to the client-side array services module.

Throughout this process, a user need only "sign-on" a single time to access services at the storage array even though a third party (the IDP in this example) provides the authentication and authorization. Such a single sign on is enabled in the client-side array services module (178) through the cross-domain resource sharing provided by the client-side array services module (178). After authentication and authorization, as long as the user maintains a session with the client-side array services module (178) and the client-side array services module (178) maintains the token generated by the IDP (174), the user need not sign in again to subsequently access services at the storage array.

Although the IDP (174) in the example of FIG. 1 is described as performing the operations of a cloud-based security module (authentication and authorization), such operations may also be performed by other modules. In the system of FIG. 1, for example, the storage array services provider (176) may, in addition to providing various storage array services to users, perform the authentication and authorization of a user as described above.

Although the storage array services provider (176) and identity provider (174) in the example of FIG. 1 are depicted as cloud-based services accessible via the Internet (172), readers of skill in the art will recognize that these services may also be implemented in a local environment not accessible via the internet. Those services may continue to be implemented in a cloud-based format (with web services, web APIs, resource sharing, and the like), but all such resources may be 'client-side' rather than accessible via the internet.

The arrangement of computing devices, storage arrays, cloud-based service providers, networks and other devices making up the exemplary system illustrated in FIG. 1 are for explanation, not for limitation. Systems useful according to various embodiments of the present invention may include different configurations of servers, routers, switches, computing devices, and network architectures, not shown in FIG. 1, as will occur to those of skill in the art.

Figure 2:
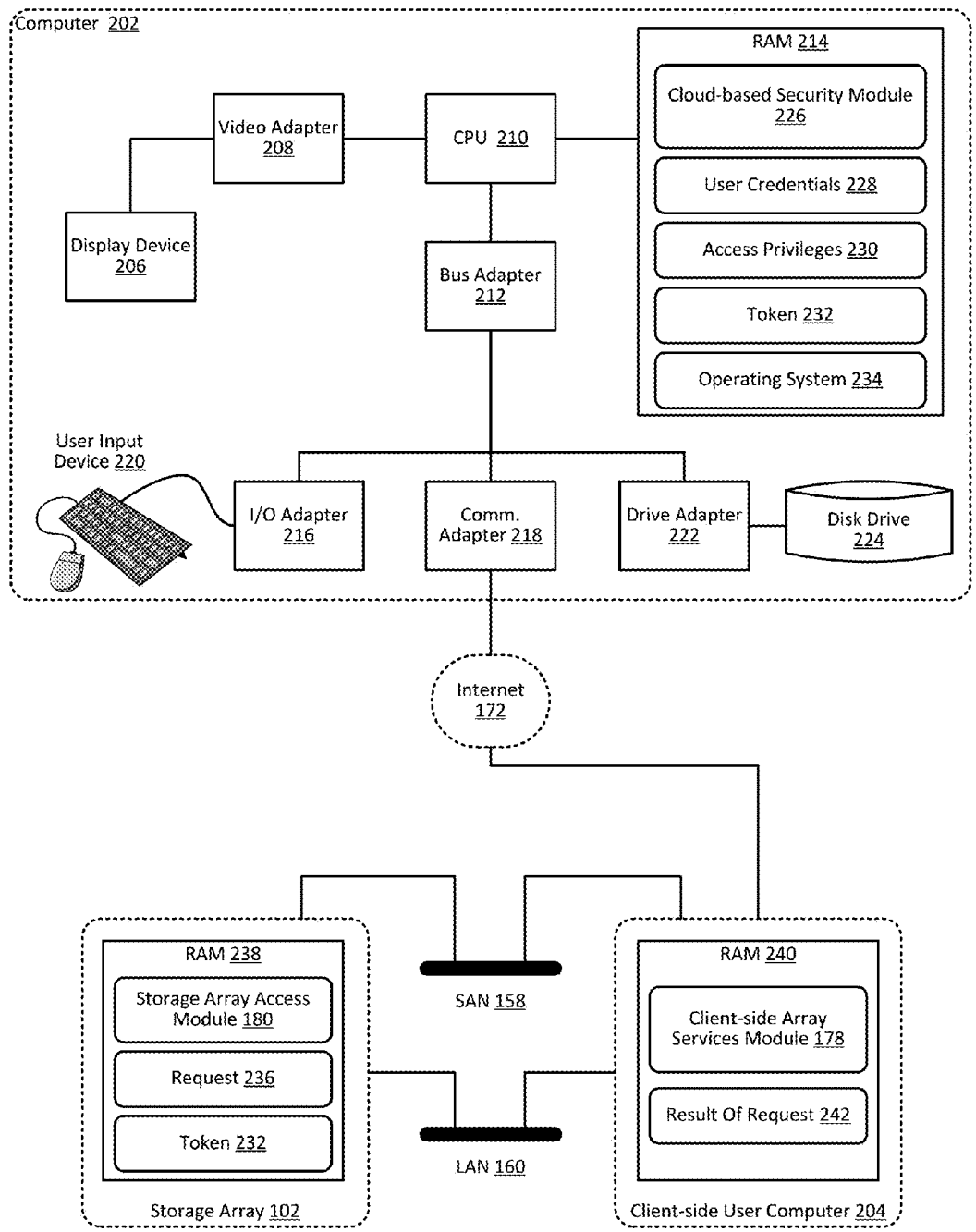
FIG. 2 sets forth a block diagram of several example computers useful for providing authorization and authentication in a cloud for a user of a storage array according to embodiments of the present invention.

Providing authorization and authentication in a cloud for a user of a storage array in accordance with embodiments of the present invention is generally implemented with computers. In the system of FIG. 1, for example, all the computing devices (164-170), storage controllers (106, 112), storage array services provider (176), and identity provider (174) may be implemented to some extent at least as computers. For further explanation, therefore, FIG. 2 sets forth a block diagram of several example computers useful for providing authorization and authentication in a cloud for a user of a storage array according to embodiments of the present invention. The example computers in FIG. 2 include a computer (202) configured to perform cloud-based security module operations, a storage array (102), and a client-side computer (204). For clarity, only one computer (202) in the example of FIG. 2 is depicted with a number of various computing components which are described below in greater detail. Readers will understand that the storage array (102) and client-side user computer (204) may include similar components that operate in a similar manner.

The computer (202) of FIG. 2 includes at least one computer processor (210) or 'CPU' as well as random access memory (214) ('RAM') which is connected through a high speed memory bus and bus adapter (212) to processor (210) and to other components of the computer (202). Stored in RAM (214) is a cloud-based security module (226), a module of computer program instructions that, when executed, causes the computer (202) of FIG. 2 to provide authorization and authentication in a cloud for a user of a storage array in accordance with embodiments of the present invention. To that end, the cloud-based security module (226) receives, from a client-side array services module, user credentials; authenticates the user credentials; identifies authorized access privileges defining one or more storage array services accessible by the user; generates a token representing the authentication of the user credentials and the authorized access privileges; and provides the token to the client-side array services module.

As mentioned above, the cloud-based security module (226) receives the user credentials (228) from a client-side array services module (178) and returns the token to the client-side array services module (178). The client-side array services module (178) may be implemented as a module of computer program instructions stored in RAM (240) and executed by a processor (not shown) of the client-side user computer (204). In the example of FIG. 2, the client-side user computer (204) is depicted as being coupled through the SAN (158) to the storage array (102) for use in storing data in the storage array. Alternatively, the client-side user computer (204) may be a device that is not connected to the storage array (102) for purposes of storing data but rather may be connected only via a LAN for purposes of performing storage array services (other than writing or reading data from storage devices). Consider, for example, a client-side user computer that is implemented as a mobile device that is carried by a system administrator. Although the mobile device is not coupled to the storage array for purposes of data storage, the system administrator may utilize the mobile device to request various reporting services that indicate storage array performance characteristics, errors, alerts, and the like.

The client-side array services module (178) may be configured for providing authorization and authentication in a cloud for a user of a storage array in accordance with embodiments of the present invention. To that end, the client-side array services module (178) may receive the user credentials (178) prior to authentication and authorization; provide the user credentials (178) to the cloud-based security module (226); and receive, from the cloud-based security module (226) after authorization and authentication, the token (232). Finally, the client-side array services module (178) may provide the token (232) to the storage array access module (180).

The client-side array services module (178) may also receive a user request (236) to access services provided by the storage array access module (180). Such requests may be received prior to or after authorization and authentication of the user credentials. When receiving such a storage array service access request prior to authorization and authentication of the user credential, the client-side array services module (178) may redirect the user from a web page (or other interface) that displays storage array service options, to a sign-on webpage for capturing user credentials.

The storage array access module (180) may be implemented as a module of computer program instructions stored in RAM (238) and executed by a processor (not shown) of the storage array (102). The storage array access module may also be configured for providing authorization and authentication in a cloud for a user of a storage array in accordance with embodiments of the present invention by: receiving, from the client-side array services module (178), the token (232); receiving, from the user via the client-side array services module (178), a user access request (236) to one or more storage array services; and determining whether to grant the user access request (236) in dependence upon the authorized access privileges represented by the token (232). If the storage array access module (180) grants the user access request (236), the storage array access module may perform the one or more requested services and return, to the client-side array services module (178) via the LAN (160), a result (242) of the request. User's will also recognize that a cloud-based storage array services provider not shown here may, in some embodiments, act as a proxy for communications between the storage array access module (180) and the client-side array services module.

Turning back to the components of the computer (202), also stored in RAM (214) is an operating system (234). Examples of operating systems useful in computers configured for providing authorization and authentication in a cloud for a user of a storage array according to embodiments of the present invention include UNIX™, Linux™, Microsoft Windows™, and others as will occur to those of skill in the art. The operating system (234) and the cloud-based security module (226) in the example of FIG. 2 are shown in RAM (168), but many components of such software typically are stored in non-volatile memory also, such as, for example, on a disk drive (224). Likewise, the modules depicted in RAM (238, 240) of the storage array (102) and client-side user computer (204) may be stored in non-volatile memory.

The computer (202) of FIG. 2 also includes disk drive adapter (222) coupled through an expansion bus and bus adapter (212) to the processor (210) and other components of the computer (202). Disk drive adapter (222) connects non-volatile data storage to the computer (202) in the form of disk drive (224). Disk drive adapters may be implemented in a variety of ways including as SATA (Serial Advanced Technology Attachment) adapters, PATA (Parallel ATA) adapters, Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example computer (202) of FIG. 2 includes one or more input/output ('I/O') adapters (216). I/O adapters implement user-oriented input/output through, for example, software drivers and computer hardware for controlling output to display devices such as computer display screens, as well as user input from user input devices (220) such as keyboards and mice. The example computer (202) of FIG. 2 also includes a video adapter (208), which is an example of an I/O adapter specially designed for graphic output to a display device (206) such as a display screen or computer monitor. Video adapter (208) is connected to the processor (210) through a high speed video bus.

The exemplary computer (202) of FIG. 2 includes a communications adapter (218) for data communications with other computers (102, 204) through the Internet (172). Such data communications may be carried out through data communications networks such as IP data communications networks, and in other ways as will occur to those of skill in the art. Communications adapters implement the hardware level of data communications through which one computer sends data communications to another computer, directly or through a data communications network. Examples of such communications adapters useful include modems for wired dial-up communications, Ethernet (IEEE 802.3) adapters for wired data communications, and 802.11 adapters for wireless data communications.

Readers of skill in the art will recognize that the components of the computer (202) as depicted in FIG. 2 are example computing components only. Such a computer (202) may be configured in various ways including, for example, as a server. Such a server may not include the I/O adapters, the driver adapters, display devices, video adapters and the like.

Figure 3:
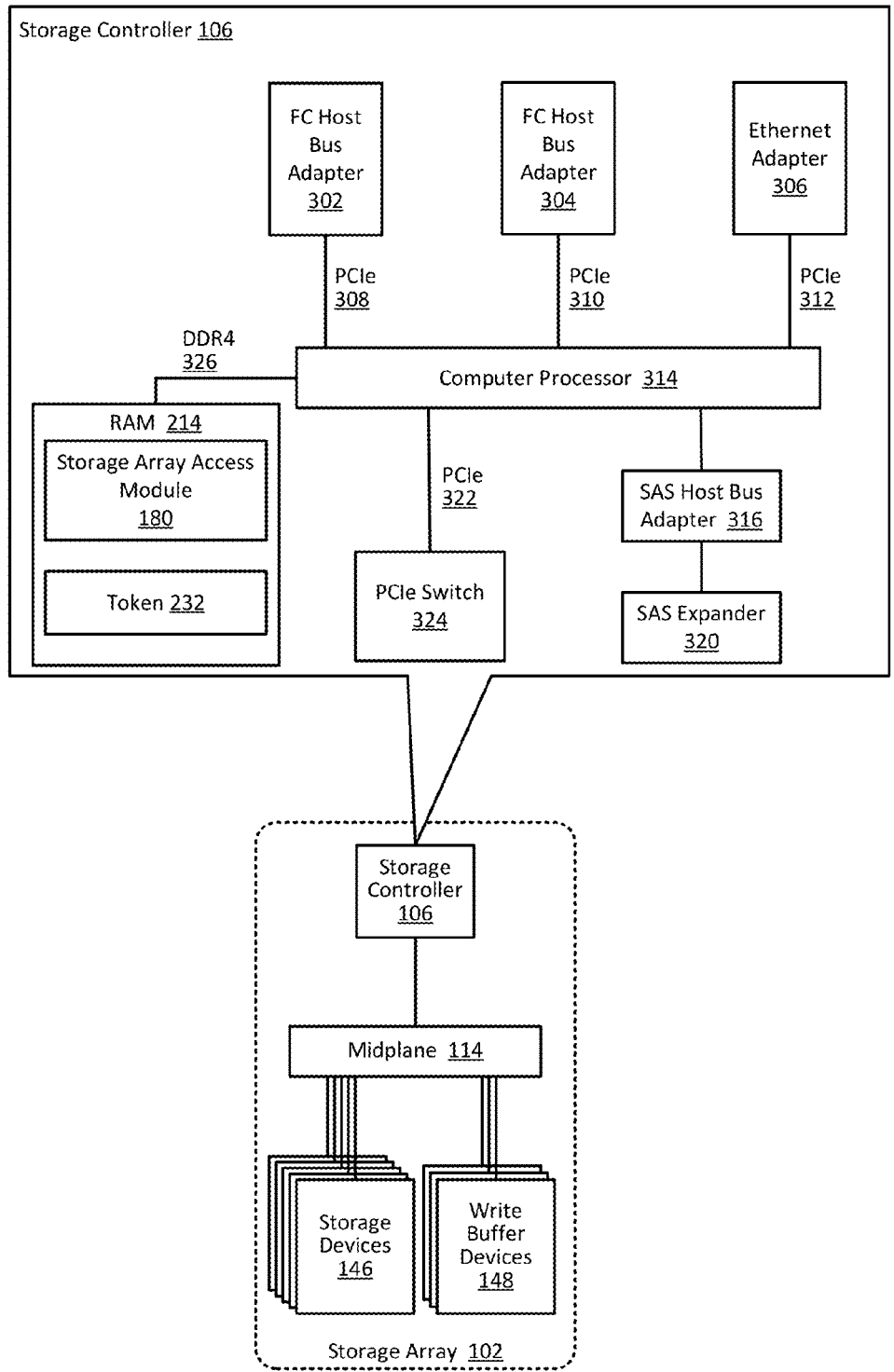
FIG. 3 sets forth a block diagram of an example storage controller of a storage array.

As mentioned above, the storage array (102) and the client-side user computer (204) may include many similar components as the computer (202). For further explanation, therefore, FIG. 3 sets forth a block diagram of an example storage controller (106) of a storage array (102). The example storage controller includes a computer processor (314). The computer processor is coupled to RAM (214) through a DDR4 (Double-Data Rate 4) bus. Stored in RAM (214) is a storage array access module (180) that operates as described above to determine whether to grant a user access request in dependence upon a token (232) representing the user's authentication and authorized privileges.

The processor (314) is also coupled for data communications through PCIe (Peripheral Component Interface express) links (308, 310, 312, 322) to several Fibre Channel host bus adapters (302, 304), an Ethernet adapter (306), and a PCIe switch (324). The Fibre Channel host bus adapters (308, 310) may couple the storage controller to a storage area network, such the SAN (158) depicted in the example of FIGS. 1 and 2. The Ethernet adapter (306) may couple the storage controller to a local area network such as the LAN (160) depicted in the example of FIGS. 1 and 2. The PCIe switch (324) may provide data communications across other PCI links through the midplane to PCI endpoints, such as storage devices or write buffer devices. Likewise, the processor (314) is also coupled through a SAS (Serial Attached SCSI) host bus adapter (316) to a SAS expander (320). The SAS expander may provide SAS connections between the computer processor (314) and other devices through the midplane.

Readers of skill in the art will recognize that these components, protocols, adapters, and architectures are for illustration only, not limitation. Such a storage controller may be implemented in a variety of different ways. Each such way is well within the scope of the present invention.

Figure 4:
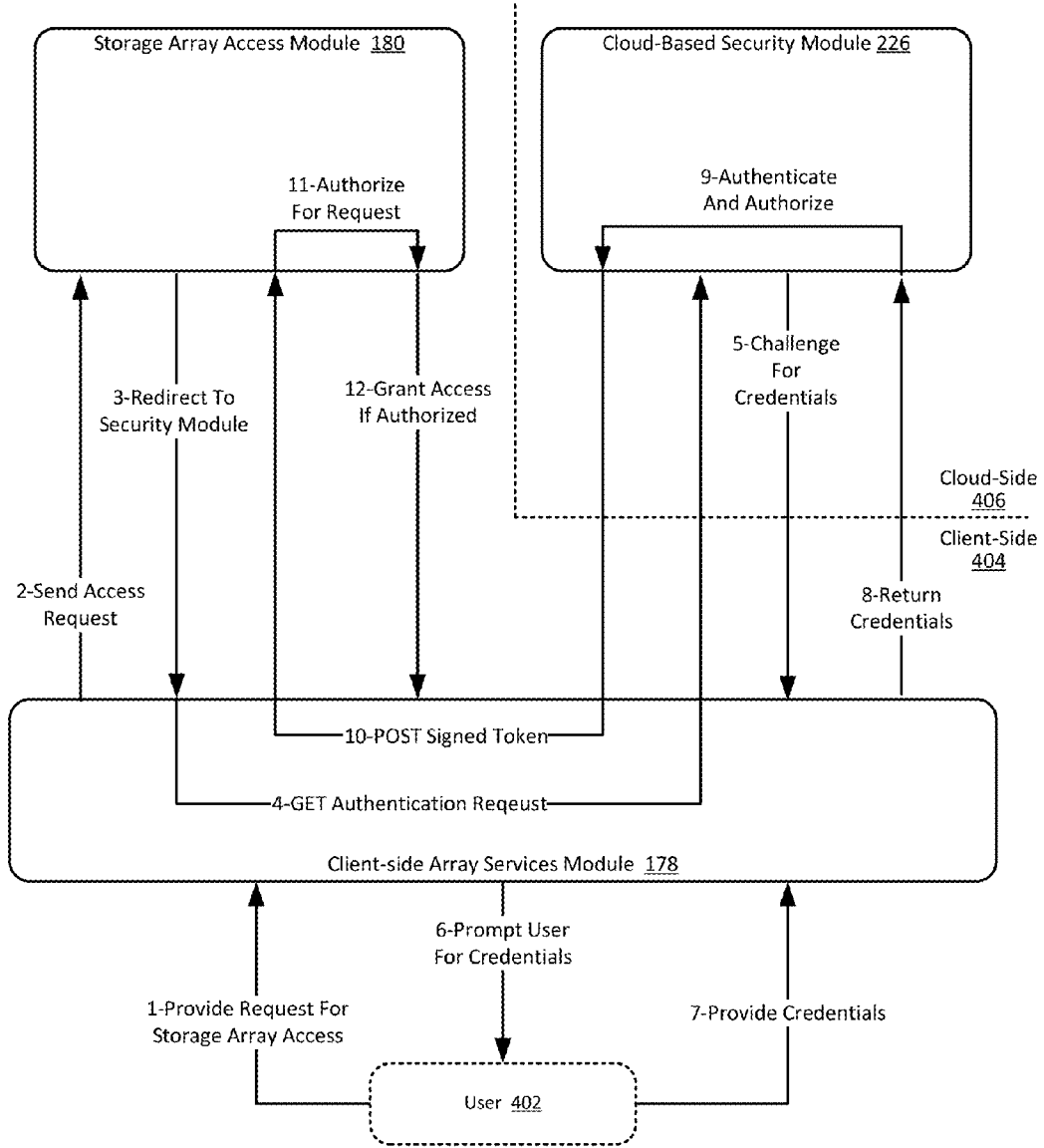
FIG. 4 sets for than example block diagram of a system carrying out authorization and authentication in a cloud for a user of a storage array in accordance with embodiments of the present invention.

For further explanation, FIG. 4 sets for than example block diagram of a system carrying out authorization and authentication in a cloud for a user of a storage array in accordance with embodiments of the present invention. The block diagram includes a storage array access module (180), a cloud-based security module (226), a client-side array services module (178), and a user (402). The cloud-based security module (226) is depicted as 'cloud-side' (406) meaning accessible through a wide area network rather than locally on a local area network. The remaining modules are depicted as client-side meaning accessible through a local area network. The example of FIG. 4 depicts one example order of interactions amongst the modules and users during authentication and authorization in accordance with embodiments of the present invention. Readers will understand that FIG. 4 is an example only, not a limitation. In fact, many of the steps set forth in the example may be carried out in a different order and all such ways are well within the scope of the present invention.

In the example of FIG. 4, the user first provides a request for storage array access to the client-side array services module (178). The client-side array services module (178) then forwards that request to the storage array access module (180). The storage array access module (180), determines that no token yet exists for the user and redirects the client-side array services module (178) to the cloud-based security module for sign-on and authentication. The client-side array services module receives, after the redirect and from the cloud-based security module (226), a challenge for credentials with which the client-side array services module (178) prompts the user. The user (402) provides the user credentials to the client-side array services module which returns the credentials to the cloud based security module (226) as a response to the challenge for the credentials. Readers of skill in the art will recognize that once a user receives a token from the cloud-based security module, a session is instantiated between the user and the storage array such that the user need not be prompted for nor provide credentials upon each subsequent access request.

The cloud-based security module (226) then authenticates and authorizes the user credentials and, through a "POST" HTTP instruction provides a signed token representing both authentication of the user credentials and authorization of the user to access one or more storage array services. The term 'signed token' refers to a token that includes a digital signature verifying the authenticity of the sender, in this case, the cloud-based security module. The client-side array services module operates as a proxy and provides the token to the storage array access module (180). The storage array access module, determines, in dependence upon the token, whether the user (402) is authorized for the particular access request. In the example of FIG. 4, the user is authorized and the storage array module grants access through the client-side array services module (178).

Readers of skill in the art will recognize that FIG. 4 sets forth an example of one-way authentication in which a user provides credentials to the cloud-based security module (226) for authentication. Such one-way authentication is an example and not a limitation. Two-way, or mutual, authentication may also be employed for systems that provide authorization and authentication in a cloud for a user of a storage array according to embodiments in of the present invention.

Figure 5:
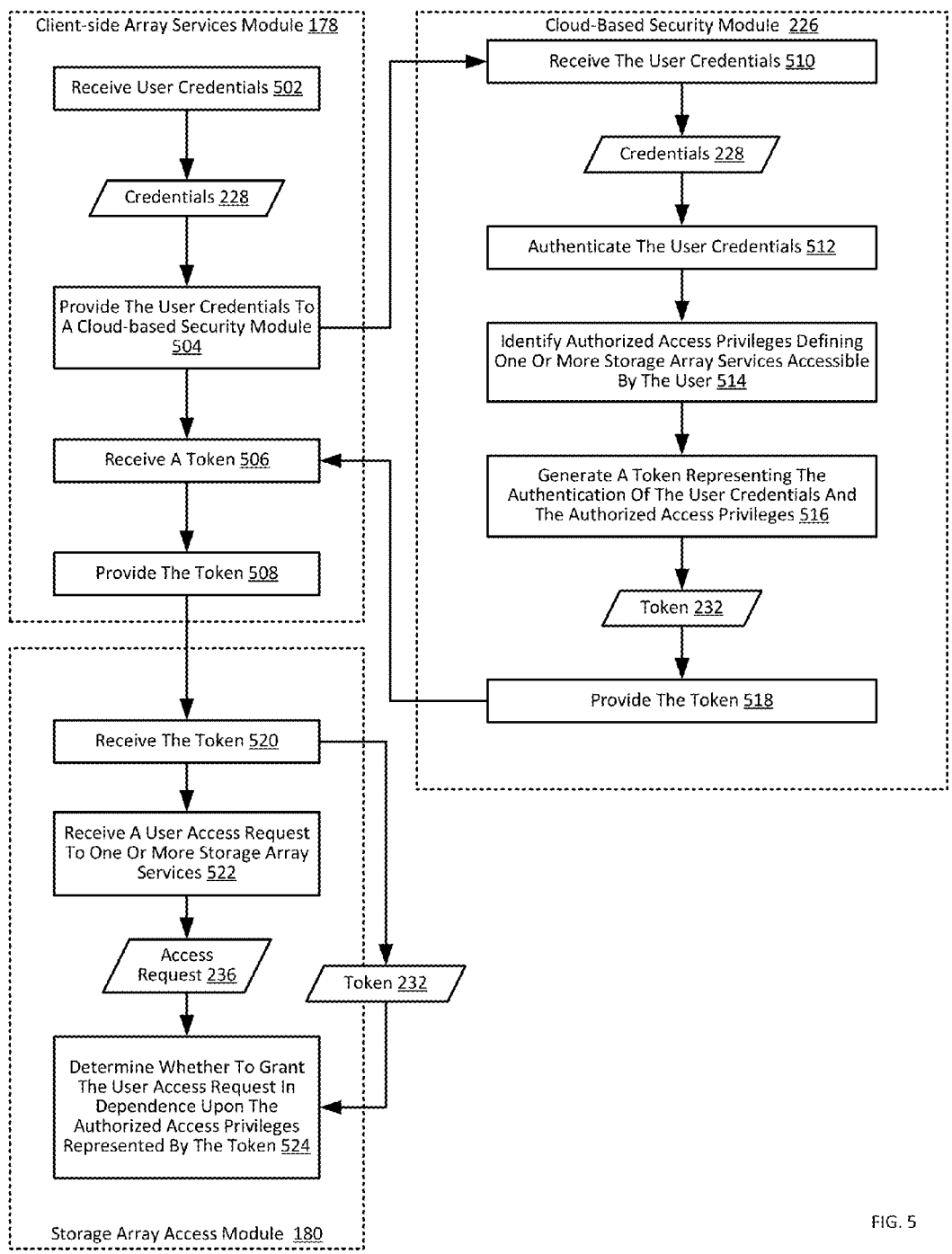
FIG. 5 sets forth a flow chart illustrating an exemplary method for providing authorization and authentication in a cloud for a user of a storage array according to embodiments of the present invention.

For further explanation, FIG. 5 sets forth a flow chart illustrating an exemplary method for providing authorization and authentication in a cloud for a user of a storage array according to embodiments of the present invention. The method of FIG. 5 includes receiving (502), by a client-side array services module (178), user credentials (228). Receiving (502) user credentials may be carried out in numerous ways including receiving a user name or other unique identifier and a password through a user input device.

The method of FIG. 5 also includes providing (504), by the client-side array services module (178), the user credentials (228) to a cloud-based security module (226) and receiving (510) the user credentials by the cloud-based security module (226) from the client-side array services module (178). Providing (504) the user credentials to a cloud-based security module, and the subsequent receiving of those credentials, may be carried out in various ways. In embodiments in which the client-side array services module is implemented as a web browser, the client-side array services module (178) may use one or more SAML (Security Assertion Markup Language) or OAUTH (Open standard for Authorization Requests) protocol requests to transmit the user credentials to the storage array access module (180).

The method of FIG. 5 also includes authenticating (512), by the cloud-based security module (226), the user credentials (228). Authenticating (512) user credentials may be carried out by through use of a lightweight directory access protocol directory service. Lightweight Directory Access Protocol (LDAP) defines a protocol by which a user may provide credentials to be used for authentication. Such a service may include a directory that includes 'distinguished names' and a password associated with each name. A distinguished name is typically unique among other names within the directory. The user credentials (228) in the example of FIG. 5 may include a user name and password. In some embodiments, the credentials may be encrypted so that the credentials are secure during transit. Upon receipt, the cloud-based security module may decrypt the credentials and compare the credentials to those stored in the directory. If a match exists, the identity of the user is authenticated.

The method of FIG. 5 also includes identifying (514), by the cloud-based security module (226), authorized access privileges defining one or more storage array services accessible by the user. The cloud-based security module (226), in addition to user identity information, may also include access privilege information that specifies for each user the user's approved access. As explained below in greater detail, in some embodiments, each user is associated with one or more profiles and each profile specifies a set of access privileges for user's associated with that profile.

The method of FIG. 5 continues by generating (516), by the cloud-based security module (226), a token (232) representing the authentication of the user credentials and the authorized access privileges. A 'token' as the term is used here is any data that represents both authentication of a user's identity and authorization of access privileges for that user.

The method of FIG. 5 also includes providing (518), by the cloud-based security module (226) to the client-side array services module (178), the token (232) and receiving (506) the token (232) by the client-side array services module (178). Providing (518) the token to the client-side array services module (178) and receiving (506) the token may also be carried out in many ways. In embodiments in which the client-side array services module is implemented as a web browser, the cloud-based security module (226) may send the token along with a digital signature representing authentication by the cloud-based security module.

The method of FIG. 5 also includes providing (508) the token (232) to a storage array access module (180) and receiving (520) the token (232) by a storage array access module (180). In some embodiments, the storage array access module (180) may expose one or more APIs to client-side array services modules for providing such tokens. Providing the token (232) to the storage array access module (180) may be carried out via one or more SAML or OAUTH protocol responses or requests via the exposed API. Readers of skill in the art will recognize that other protocols may be utilized to provide data communications between the client-side array services module (178) and the storage array access module (180).

The method of FIG. 5 also includes receiving (522), by the storage array access module (180) from a user, a user access request (236) to one or more storage array services. Receiving (522) a user access request from a user may be carried out by receiving a call to an API exposed by the storage array access module (180) from the client-side array services module (178). That is the client-side array services module may provide a set of service options to a user via a graphical user interface or other interface and receive a selection of such an option from the user. The client-side array services module may then provide that selection, to the storage array access module (180), as a user access request to a storage array service.

The method of FIG. 5 also includes determining (524), by the storage array access module (180), whether to grant the user access request in dependence upon the authorized access privileges represented by the token (232). Determining (524) whether to grant the user access request may be carried out by determining whether the authorized access privileges represented by the token (232) indicate that the user access request is directed to storage array services authorized to be accessible by the user.

In some embodiments, the authorized access privileges may be effectively tiered so that the access privileges provided represented in the token are only a low or base level of authorization. In some embodiments, the access privileges may be further defined in the storage array access module itself for a plurality of users. That is, the storage array may include even higher level, finer grained, or even contradictory access privileges relative to those stored in the cloud-based security module. In this way, the storage array access module may determine whether to grant an access request by the user in dependence upon both the token and the access privileges defined in the storage array access module.

Readers of skill in the art will recognize that once a user receives (506) a token from the cloud-based security module (226), a session may be instantiated between the user and the storage array such that the user need not provide credentials upon each subsequent access request. That is, a user may be authenticated and authorized once by the cloud-based security module to instantiate a session, then the user may proceed to make multiple access requests without reauthenticating or reauthorizing until the session ends. A session may end in a variety of manners including after a predefined amount of time, after a period of timeout due to inactivity, an explicit selection by the user to exit the session (logging-out, for example), or the like.

Figure 6:
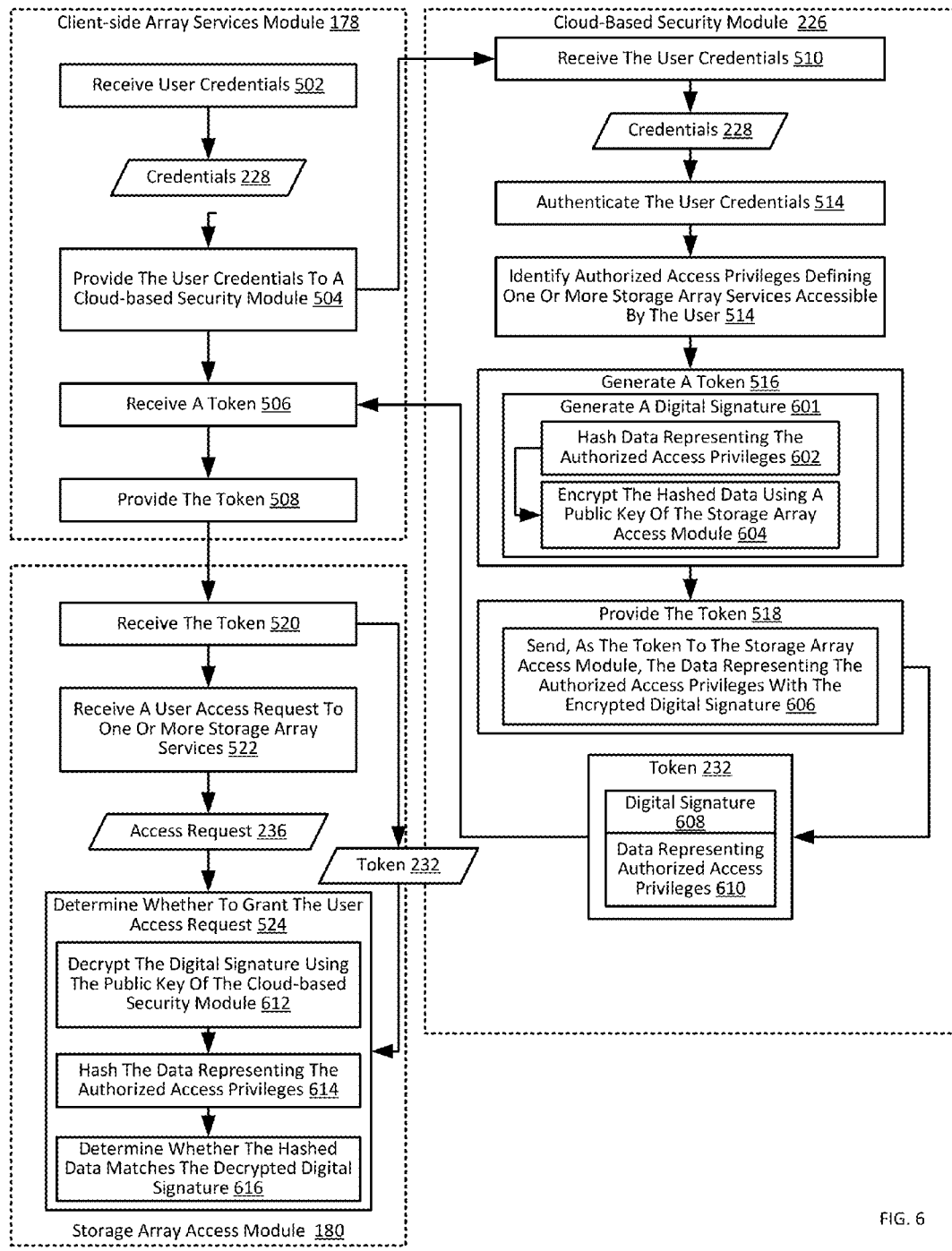
FIG. 6 sets forth a flow chart illustrating another method of providing authorization and authentication in a cloud for a user of a storage array in accordance with embodiments of the present invention.

For further explanation, FIG. 6 sets forth a flow chart illustrating another method of providing authorization and authentication in a cloud for a user of a storage array in accordance with embodiments of the present invention. The method of FIG. 6 is similar to the method of FIG. 5 including, as it does: providing (504) the user credentials (228) to a cloud-based security module (226); receiving (502), by a client-side array services module (178), user credentials (228); receiving (510), by the cloud-based security module, the user credentials (228); authenticating (514) the user credentials; identifying (514) authorized access privileges defining one or more storage array services accessible by the user; generating (516), a token representing the authentication of the user credentials and the authorized access privileges; providing (518) the token to the client-side array services module; receiving (506) the token (232) by the client-side array services module (178); providing (508) the token (232) to a storage array access module (180); receiving (520) the token (232) by the storage array access module (180); receiving (522) a user access request to one or more storage array services; and determining (524) whether to grant the user access request in dependence upon the authorized access privileges represented by the token.

The method of FIG. 6 differs from the method of FIG. 5, however, in that in the method of FIG. 6 generating (516) the token representing the authentication of the user credentials and the authorized access privileges includes generating (601) a digital signature of data representing the authorized access privileges. Generating (601) the digital signature includes hashing (602) the data representing the authorized access privileges and encrypting (604) the hashed data using a public key of the storage array access module. The encrypted hashed data forms the digital signature.

Also in the method of FIG. 6, providing (518) the token (232) to the client-side array services module includes sending (606), as the token (232) to the storage array access module (180), the data representing the authorized access privileges (610) with the digital signature (608).

Also in the example of FIG. 6, determining (524) whether to grant the user access request includes decrypting (612) the digital signature using the public key of the cloud-based security module; hashing (614) the data representing the authorized access privileges; and determining (616) whether the hashed data matches the decrypted digital signature.

Readers of skill in the art will recognize that, like FIG. 5, once a user receives (506) a token from the cloud-based security module (226), a session may be instantiated between the user and the storage array such that the user need not provide credentials upon each subsequent access request. That is, a user may be authenticated and authorized once by the cloud-based security module to instantiate a session, then the user may proceed to make multiple access requests without reauthenticating or reauthorizing until the session ends. A session may end in a variety of manners including after a predefined amount of time, after a period of timeout due to inactivity, an explicit selection by the user to exit the session (logging-out, for example), or the like.

Exemplary embodiments of the present invention are described largely in the context of a fully functional computer system. Readers of skill in the art will recognize, however, that the present invention also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware, as hardware, or as an aggregation of hardware and software are well within the scope of embodiments of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing authorization and authentication in a cloud for a user of a storage array, the method comprising:

receiving, by a storage array access module from a client-side array services module, a token representing authentication of user credentials and authorized access privileges defining one or more storage array services accessible by the user, wherein the token is generated by a cloud-based security module upon authentication of the user credentials and identification of authorized access privileges for the user, wherein access privileges are defined in the cloud-based security module for a plurality of users with an association of each user with one of a plurality of profiles, each profile specifying access privileges for users associated with the profile, and wherein the plurality of profiles comprise at least one storage-array specific profile specifying access privileges for a single storage array and multi-array profiles specifying access privileges for a plurality of storage arrays;

receiving, by the storage array access module from the user, a user access request to one or more storage array services; and determining, by the storage array access module, whether to grant the user access request in dependence upon the authorized access privileges represented by the token.

2. The method of claim 1, wherein the cloud-based security module comprises a cloud identity provider ('IDP').

3. The method of claim 1, wherein the cloud-based security module comprises a component of a cloud-based storage array services provider.

4. The method of claim 1, wherein the cloud-based security module comprises a lightweight directory access protocol directory service.

5. The method of claim 1, wherein:

access privileges are further defined in the storage array access module for the plurality of users; and determining whether to grant the user access request in dependence upon the authorized access privileges represented by the token includes determining whether to grant the user access request in dependence upon the access privileges defined in the storage array access module as well as the token.

6. The method of claim 1, wherein the plurality of profiles comprise:

a read-only profile specifying, for users associated with the read only profile, read-only access privileges;

a modify profile specifying, for users associated with the modify profile, read and modify access privileges; and an administrator profile specifying, for users associated with the administrator profile, all available access privileges.

7. The method of claim 1, wherein the token further comprises data representing the authorized access privileges and a digital signature and determining whether to grant the user access request further comprises:

decrypting the digital signature using the public key of the cloud-based security module;

hashing the data representing the authorized access privileges; and determining whether the hashed data matches the decrypted digital signature.

8. An apparatus for providing authorization and authentication in a cloud for a user of a storage array, the apparatus comprising a computer processor, a computer memory operatively coupled to the computer processor, the computer memory having disposed within it computer program instructions that, when executed by the computer processor, cause the apparatus to carry out the steps of:

receiving, by a storage array access module from a client-side array services module, a token representing authentication of user credentials and authorized access privileges defining one or more storage array services accessible by the user,
  wherein the token is generated by a cloud-based security module upon authentication of the user credentials and identification of authorized access privileges for the user,
  wherein access privileges are defined in the cloud-based security module for a plurality of users with an association of each user with one of a plurality of profiles, each profile specifying access privileges for users associated with the profile, and
  wherein the plurality of profiles comprise at least one storage-array specific profile specifying access privileges for a single storage array and multi-array profiles specifying access privileges for a plurality of storage arrays;
receiving, by the storage array access module from the user, a user access request to one or more storage array services; and
determining, by the storage array access module, whether to grant the user access request in dependence upon the authorized access privileges represented by the token.

9. The apparatus of claim 8, wherein the cloud-based security module comprises a cloud identity provider ('IDP').

10. The apparatus of claim 8, wherein the cloud-based security module comprises a component of a cloud-based storage array services provider.

11. The apparatus of claim 8, wherein:
access privileges are further defined in the storage array access module for the plurality of users; and
determining whether to grant the user access request in dependence upon the authorized access privileges represented by the token includes determining whether to grant the user access request in dependence upon the access privileges defined in the storage array access module as well as the token.

12. The apparatus of claim 8, wherein access privileges are defined in the cloud-based security module for a plurality of users with an association of each user with one of a plurality of profiles, each profile specifying access privileges for users associated with the profile.

13. A computer program product for providing authorization and authentication in a cloud for a user of a storage array, the computer program product disposed upon a non-transitory computer readable medium, the computer program product comprising computer program instructions that, when executed, cause a computer to carry out the steps of:
  receiving, by a storage array access module from a client-side array services module, a token representing authentication of user credentials and authorized access privileges defining one or more storage array services accessible by the user,
    wherein the token is generated by a cloud-based security module upon authentication of the user credentials and identification of authorized access privileges for the user,
    wherein access privileges are defined in the cloud-based security module for a plurality of users with an association of each user with one of a plurality of profiles, each profile specifying access privileges for users associated with the profile, and
    wherein the plurality of profiles comprise at least one storage-array specific profile specifying access privileges for a single storage array and multi-array profiles specifying access privileges for a plurality of storage arrays;
  receiving, by the storage array access module from the user, a user access request to one or more storage array services; and
  determining, by the storage array access module, whether to grant the user access request in dependence upon the authorized access privileges represented by the token.

14. The computer program product of claim 13, wherein the cloud-based security module comprises a cloud identity provider ('IDP').

15. The computer program product of claim 13, wherein the cloud-based security module comprises a component of a cloud-based storage array services provider.

16. The computer program product of claim 13, wherein:
access privileges are further defined in the storage array access module for the plurality of users; and
determining whether to grant the user access request in dependence upon the authorized access privileges represented by the token includes determining whether to grant the user access request in dependence upon the access privileges defined in the storage array access module as well as the token.

* * * * *